US009767002B2

(12) United States Patent
Edri et al.

(10) Patent No.: US 9,767,002 B2
(45) Date of Patent: Sep. 19, 2017

(54) VERIFICATION OF PRODUCT RELEASE REQUIREMENTS

(71) Applicant: Red Hat Israel, Ltd., Raanana (IL)

(72) Inventors: Eyal Edri, Tel Aviv (IL); Doron Fediuck, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 121 days.

(21) Appl. No.: 14/630,828

(22) Filed: Feb. 25, 2015

(65) Prior Publication Data

US 2016/0246699 A1 Aug. 25, 2016

(51) Int. Cl.
G06F 11/36 (2006.01)
G06F 9/44 (2006.01)

(52) U.S. Cl.
CPC ............ *G06F 11/3612* (2013.01); *G06F 8/10* (2013.01); *G06F 8/68* (2013.01); *G06F 8/71* (2013.01)

(58) Field of Classification Search
CPC ..... G06F 8/68; G06F 8/71; G06F 8/10; G06F 11/3612
USPC ....................................................... 717/125
See application file for complete search history.

(56) References Cited

U.S. PATENT DOCUMENTS

| | | | |
|---|---|---|---|
| 7,546,334 B2 * | 6/2009 | Redlich ............ | G06F 17/30699 709/201 |
| 7,657,872 B2 | 2/2010 | Kelbaugh et al. | |
| 7,730,005 B2 | 6/2010 | Gilliam et al. | |
| 8,615,741 B2 | 12/2013 | Hudson | |
| 2006/0259896 A1 * | 11/2006 | Hanson ..................... | G06F 8/20 717/118 |
| 2009/0187453 A1 | 7/2009 | Dill et al. | |
| 2009/0222811 A1 * | 9/2009 | Faus ......................... | G06F 8/65 717/173 |
| 2010/0191731 A1 | 7/2010 | Rus et al. | |
| 2010/0235807 A1 | 9/2010 | Doddappa et al. | |
| 2011/0238768 A1 | 9/2011 | Habets et al. | |
| 2012/0124022 A1 * | 5/2012 | Goping ................. | G06F 19/324 707/705 |
| 2014/0173737 A1 | 6/2014 | Toback et al. | |

(Continued)

OTHER PUBLICATIONS

"Developer's Guide—OpenStack Project Infrastructure Manual", openstack.org, 12 pages https://wiki.openstack.org/wiki/GerritJenkinsGit (Last accessed Dec. 29, 2014).

(Continued)

*Primary Examiner* — John Chavis
(74) *Attorney, Agent, or Firm* — Lowenstein Sandler LLP (57) ABSTRACT

A method relates to identifying, by a processing device, a bug ticket stored in a data record, wherein the bug ticket is associated with a patch comprising code to fix a bug described in the bug ticket, and wherein the bug ticket comprises a version flag indicating whether the bug ticket receives all of a plurality of acknowledgements, determining, in view of a value of the version flag, that the bug ticket does not include an acknowledgement required to place the patch into a production repository, determining, in view of a set of acknowledgement flags of the bug ticket, an entity responsible for providing the acknowledgement, and transmitting a notification to the entity, wherein the notification comprises a hyperlink linked to a user interface page to provide the acknowledgement by the entity.

20 Claims, 4 Drawing Sheets

(56) References Cited

U.S. PATENT DOCUMENTS

2014/0325487 A1* 10/2014 Maczuba ............ G06F 11/0778
717/128
2016/0259636 A1* 9/2016 Plate ....................... G06F 11/30
2016/0328227 A1* 11/2016 Kharbanda ............... G06F 8/65

OTHER PUBLICATIONS

"Fogbugz Documentation", fogcreek.com, Fog Creek Software, 178 pages http://www.fogcreek.com/fogbugz/documentation/ (Last accessed Dec. 29, 2014).

* cited by examiner

VERIFICATION OF PRODUCT RELEASE REQUIREMENTS

TECHNICAL FIELD

This disclosure relates to software product development and, in particular, to facilitating the verification of software product release requirements.

BACKGROUND

Software is often developed through a series of different versions including major releases and minor releases. Major releases may include redesign of the architecture of the software, and significant changes to features and functionalities of the software. Minor releases, made more frequently than major releases, may include bug fixes and minor changes to certain existing features and functionalities. Between releases, users of the software may detect bugs in the software and may submit the bugs to the owner of the software to fix these bugs.

BRIEF DESCRIPTION OF THE DRAWINGS

The present disclosure is illustrated by way of example, and not by way of limitation, in the figures of the accompanying drawings.

DETAILED DESCRIPTION

A patch may fix one or more bugs (or add one or more features). For simplicity of description, a bug or a feature is collectively referred to as a "bug" herein. A patch, when applied, may modify one or more lines of code in the software to fix the bug. A bug is commonly reported to the software owner by creating a ticket in a bug ticket system (referred to as a "bug ticket"). Before creating a patch to fix the bug, the bug ticket needs multiple approvals from various relevant entities. For example, the approvals may include an approval from a product manager who determines whether the bug fix (or added feature) meets customer's needs, an approval from a code development manager who determines whether a patch to fix the bug is technically feasible, and an approval from a quality assurance manager who determines whether the patch can be validated prior to the next release date. Each relevant entity may acknowledge the bug ticket by providing his or her approval or disapproval. When all entities approve the bug ticket, the patch has the permission to go into the software product in a next release. If any of the entities disapprove, the patch cannot enter software product.

Due to various reasons, these mandatory acknowledgements are often not provided by entities with authority in time during product planning phase. Without the necessary approvals (or disapproval) of a bug ticket, it is unclear whether the patch can be created and entered into a next release of the software.

Manual reminders, such as e-mail reminders, meetings, or personal face-to-face contacts are often used to remind entities that, for various reasons, fail to provide timely acknowledgements necessary to determine whether to accept a bug ticket into patch production. These manual reminders are prone to error and place a burden on the requester to take a necessary action in an allotted time frame. Manual reminders also add risk to the release date if timely acknowledgements are missing for specific bugs. For example, if the acknowledgements are not provided timely, there may be insufficient time to create a patch to fix the specific bugs, and the release of the software may be delayed due to technical limitation which requires all the bugs to be fully fixed.

Implementations of the present disclosure include systems and methods that may query a bug ticket system to identify bug tickets that have not acquired all of the requisite acknowledgements, determine the entities that neglect to provide the requisite acknowledgements, and generate and transmit a notification to the neglecting entities to request the missing acknowledgements. In one implementation, the query to the bug ticket system may specify certain criteria to filter the bug tickets that need acknowledgements. For example, in one implementation, the criteria may identify any bug tickets created during a certain time period.

Implementations of the present disclosure relate to identifying, by a processing device, a bug ticket stored in a data record, wherein the bug ticket is associated with a patch including code to fix a bug described in the bug ticket, and wherein the bug ticket comprises a version flag indicating whether the bug ticket receives all of a plurality of acknowledgements, determining, in view of a value of the version flag, that the bug ticket does not include an acknowledgement required to place the patch into a production repository, determining, in view of a set of acknowledgement flags of the bug ticket, an entity responsible for providing the acknowledgement, and transmitting a notification to the entity, wherein the notification comprises a hyperlink linked to a user interface page to provide the acknowledgement by the entity.

Implementations of the present disclosure relate to a system including a memory and a processing device, operatively coupled to the memory, the processing device to identify a bug ticket stored in a data record, wherein the bug ticket is associated with a patch including code to fix a bug described in the bug ticket, and wherein the bug ticket comprises a version flag indicating whether the bug ticket receives all of a plurality of acknowledgements, determine, in view of a value of the version flag, that the bug ticket does not include an acknowledgement required to place the patch into a production repository, determine, in view of a set of acknowledgement flags of the bug ticket, an entity responsible for providing the acknowledgement, and transmit a notification to the entity, wherein the notification comprises a hyperlink linked to a user interface page to provide the acknowledgement by the entity.

Figure 1:
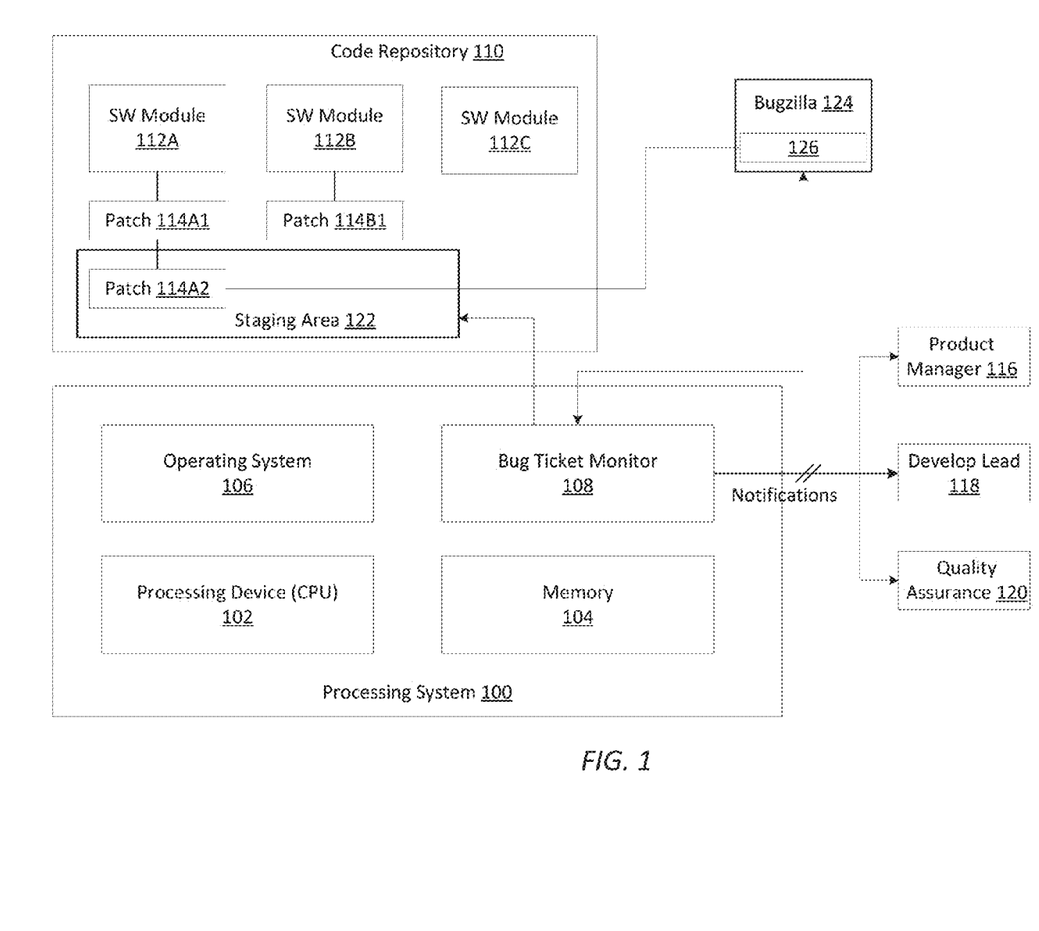
FIG. 1 illustrates a processing system to identify bug tickets with missing acknowledgements and to notify the responsible entities according to an implementation of the present disclosure.

FIG. 1 illustrates a processing system 100 to identify a bug ticket requiring an acknowledgement and to notify a responsible entity according to some implementations of the present disclosure. An entity can be one or more persons who have the responsibility to review certain aspect of the bug ticket and provide his or her opinion of the bug ticket. An acknowledgement can be an approval or a disapproval of the bug ticket. In one implementation, an entity may provide the acknowledgement by setting an acknowledgement flag associated with the bug ticket to a certain value. Referring to FIG. 1, the processing system 100 may include a processing device 102 (such as a central processing unit (CPU) with one or more processing cores) and a memory device 104 operatively coupled to the processing device 102. The processing system 100 may be any type of computing devices including, but not limited to, a server computer. The memory device 104 may store executable instructions of software applications and the data associated with execution of the software applications. The processing device 102 coupled to the memory 104 may execute the instructions of the software applications.

In one implementation, the processing system 100 may include other resources (not shown) such as network cards to transmit and/or receive data with a network and storage devices that are mountable to the processing system 100. An operating system 106 may serve as a software layer to the software applications with an abstract computer model to handle and manage all the resources of the processing system 100.

In one implementation, the processing system 100 is coupled to a code repository 110 which may be a networked repository that is accessible by different open source developers. In one implementation, the code repository 110 may be a GIT version-controlled code repository. Open source developers may develop software modules of an open source product, and submit, by uploading, these modules to the code repository 110. For example, an open source operating system (such as releases of Red Hat Enterprise Linux) includes a kernel that includes hundreds of modules such as kernel-based virtual machine (KVM) and the file system. Referring to FIG. 1, code repository 110 (e.g., a GIT repository used by open source code development) may include a data store as a centralized or distributed code depot to receive and store software modules uploaded by open source developers. For example, open source developers may upload software modules 112A-112C to the code repository 110. These software modules 112A-112C constitute part of an open source software product. An organization (such as a corporation or a non-profit association) is responsible for collecting and integrating various software modules into the open source product and releases a tested version of the open source product as a current version of the open source product.

In the process of open source product development, the software modules 112A-112C submitted by developers are reviewed and tested by other programmers either from a third party or from the organization that is responsible to release the product. During the review and testing process, these programmers may discover bugs and develop patches to software modules to these bugs. These patches, when applied to the associated software modules, may cause the insertion and/or deletion one or more lines of code in the associated software modules. For example, referring to FIG. 1, an open source programmer may have developed a first patch 114A1 to enhance certain functionality in the software module 112A, and later, another open source developer (or the same open source developer) may develop a second patch 114A2 improving on the first patch 114A1. Each of patches 114A1, 114A2 may insert or delete one or more lines of code in the software module 112A. Similarly, patch 114B1 may modify the code of software module 112B. These patches 114A1, 114A2, 114B1 are stored in code depository 110 along with software modules 112A, 112B, 112C.

A patch to the software module is typically used to fix a bug or enhance a feature. To add a patch to the software module, a bug ticket 126 is created in the bugzilla 124. The bugzilla 124 is a data record to store a record of a proposed bug fix and its status, including information about each proposed bug fix. In one implementation, bug ticket 126 as a data entry in bugzilla 124 may include a number of acknowledgement flags indicating whether the proposed bug fix has received the necessary acknowledgements (approval or disapproval). For example, the bug ticket 126 may include a first acknowledgement flag indicating whether the program manager 116 has acknowledged patch 114A2, a second acknowledgement flag indicating whether the code development manager 118 has acknowledged patch 114A2, and a third acknowledgement flag indicating whether the quality assurance manager 120 has acknowledged patch 114A2.

In one implementation, each acknowledgement flag includes one or more values representing whether an entity responsible for the acknowledgement has checked the flag. In one implementation, for example, an acknowledgement flag value of zero (0) may indicate that the entity has not acknowledged the bug ticket 126, a value of one (+1) may indicate that the entity has acknowledged and approved the bug ticket 126, and a value of negative one (−1) may indicate that the entity has acknowledged and disapproved the bug ticket 126.

In one implementation, bug ticket 126 may further include a version flag to indicate an overall acknowledgement status of the bug ticket. The version flag may be set to according to values of the first to third acknowledgement flags to indicate whether the bug ticket has received all the necessary acknowledgements. For example, the version flag may be set to one (+1) if the bug ticket 126 receives all three acknowledgements, and set to zero if the bug ticket 126 does not receive any of the three acknowledgements. In one implementation, the version flag may be updated when a value of a respective acknowledgement flag is updated. For example, the value of the version flag may be calculated as a combination of the values of the first to third acknowledgement flags (e.g., first acknowledgement flag||second acknowledgement flag||third acknowledgement flag; wherein "||" represents the AND operator). As such, the value of the version flag, by itself, may determine whether a bug ticket has all the necessary acknowledgements.

A bug ticket 126 can be created in the bugzilla 124 in response to a request to change certain behavior of a software module. After the bug ticket 126 receives all of the necessary acknowledgements (e.g., the first to third acknowledgement flags are checked with approval by entities with authority), a programmer may be assigned to create a patch for the bug ticket. Under certain situations (e.g., at an urgent request), a developer may create a patch for a bug ticket prior to the bug ticket receiving all of the necessary acknowledgements. But, the patch associated with a bug ticket that has not been approved still cannot be entered into the software production.

Thus, a bug ticket 126 needs to undergo a review and approval process before a patch associated with the bug ticket 126 can be submitted to an authoritative repository storing approved patches that can be integrated into the software product. In one implementation, as discussed above, a patch 114A2 may be submitted to a staging area 122 which is part of the code repository where the patch undergoes the review and approval process before entering into production. The submitted patch 114A2 may be associated with bug ticket 126 before the bug ticket 126 receives all of the necessary acknowledgements. An acknowledgement by an entity means that the entity has reviewed and provided an opinion with respect to the bug ticket 126. For example, bug ticket 126 may require acknowledgements from a product manager, a code development manager, and a quality assurance manager. Each entity may be one or more persons that have the authority to acknowledge and approve (or disapprove) entering the patch into software production. When the bug ticket 126 receives all three acknowledgements and approvals, the patch 114A2 associated with the bug ticket 126 may pass its version review and may be submitted to production. If, however, any of the requisite entities disapprove the bug ticket 126, the patch 114A2 cannot enter into software production. In one implementation, the developer may commit patch 114A2 to the staging area 112 before the bug ticket 126 receives the necessary acknowledgements. The developer may record a hyperlink in the commit message of patch 114A2 to link the pending patch 114A2 to the bug ticket 126 in the bugzilla 124. This hyperlink in the commit message of patch 114A2 enables the detection of which pending patch associated with a bug ticket that does not have all of the necessary acknowledgements.

In one implementation, to ensure that each entity timely reviews and acknowledges the bug ticket 126 stored in the bugzilla 124, processing system 100 includes a bug ticket monitor application 108, executed on processing device 102, to identify all bug tickets in the bugzilla 124 that have not received all necessary acknowledgements and identify the entities associated with and responsible for providing the missing acknowledgements. The bug ticket monitor application 108 may generate and transmit a customized notification to each of these entities to request the missing acknowledgements.

In one implementation, the bug tickets are identified according to certain criteria. For example, the bug tickets monitor application 108 may identify a patch that has been uploaded to the staging area 122 during a specific period of time (e.g., last twenty four hours or uploaded since last release of the software product) associated with a bug ticket with at least one missing acknowledgement. The bug ticket monitor application 108 may generate and transmit a notification to responsible entities to request the missing acknowledgements. For example, as shown in FIG. 1, if the bug ticket monitor application 108 identifies patch 114A2 including a hyperlink to a bug ticket having missing acknowledgements from product manager 116, development lead 118, and quality assurance 120, the bug ticket monitor application 108 generates e-mail notifications to product manager 116, development lead 118, and quality assurance 120 to request their acknowledgements of the bug ticket. The e-mail notification, targeting the entity responsible for the acknowledgement, may include a link to a web page of the bug ticket on which the responsible entities may provide the necessary acknowledgement. For example, the web page may include an actionable interface element (e.g., checkbox including a set of values to select) associated with the necessary acknowledgement. The entity may activate the actionable element to provide the necessary acknowledgement. For example, the entity may select a value of one (+1) to indicate approval and a value of negative one (−1) to indicate disapproval. Because of the targeted notification, entities that are not linked to the patch are not notified by the bug ticket monitor application 108.

The code repository 110 as shown in FIG. 1 may be implemented as a suitable type of version-controlled code repository. In one implementation, the version-controlled code repository may be a GIT type code repository that includes a Gerrit code review tool. The bug ticket monitor application 108 and the staging area 122 are implemented using the Gerrit code review tool. Thus, changes to the software product undergo the review and approval process before entering into the software production.

Figure 2:
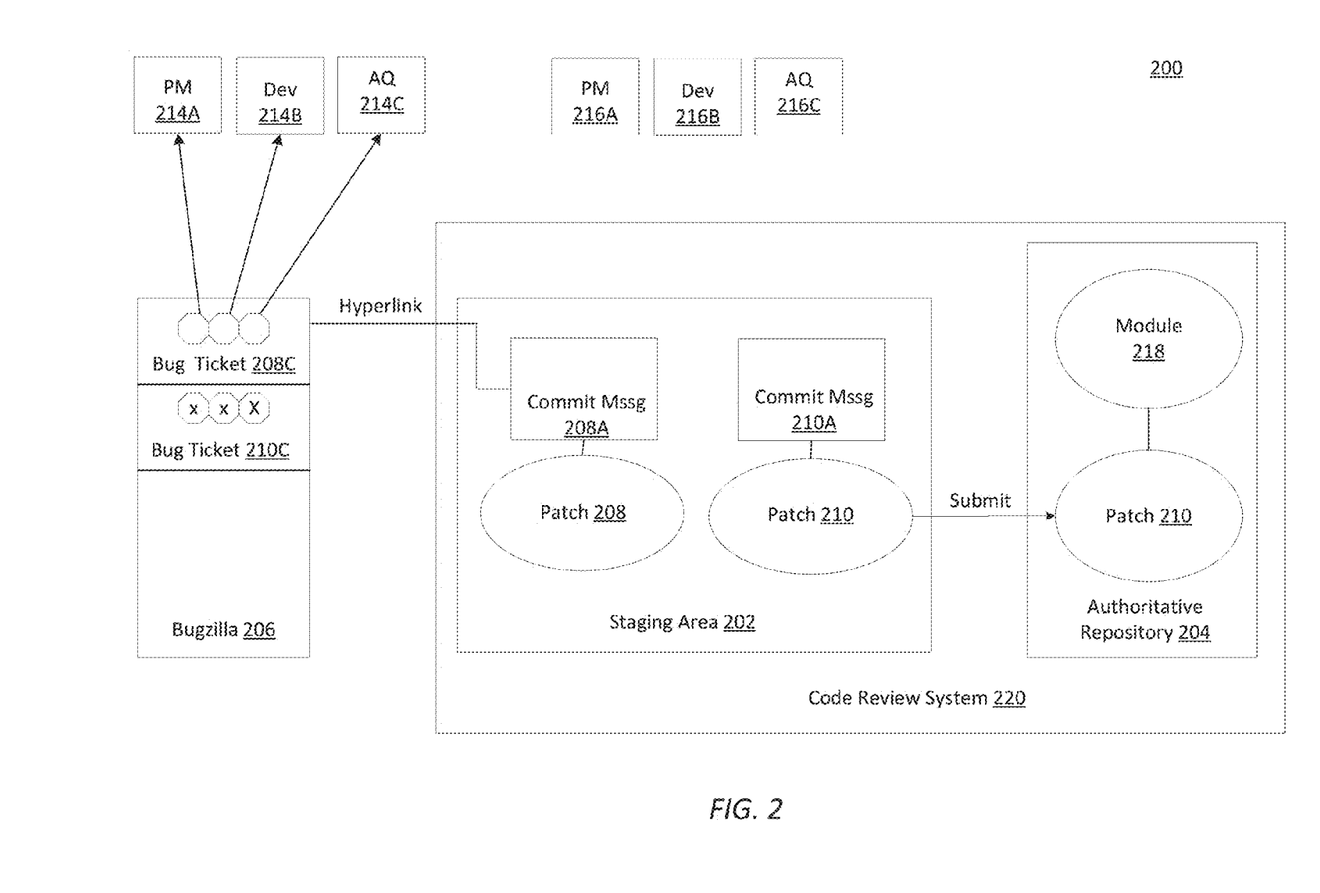
FIG. 2 illustrates a bug ticket acknowledgment system according to an implementation of the present disclosure.

FIG. 2 illustrates a bug ticket acknowledgment system according to an implementation of the present disclosure. Referring to FIG. 2, the bug ticket acknowledgement system 200 includes a bugzilla 206 and a code review system 220. The code review system 220 may be a GIT version-controlled code repository including a staging area 202 and an authoritative repository 204. The authoritative repository 204 may store software module 218 as part of an open source product to be released to the public. During testing and reviewing process, programmers may submit patches 208, 210 to fix certain bugs uncovered by the programmers. In one implementation, programmers may submit, by a commit command, patches 208, 210 to the staging area 202 to wait for the necessary acknowledgements and approvals before they can be submitted to the authoritative repository 204 (or the production repository) and integrated into software module 218.

In one implementation, the bug ticket acknowledgement system 200 may provide a web-based user interface (not shown) for parties to submit bug tickets 208C, 210C to the bugzilla 206. When submitting a bug ticket to the bugzilla 206, the bug ticket creator may use the user interface to specify one or more entities whose approvals are needed before a patch associated with the bug ticket can be submitted to the authoritative repository 204. In an implementation, if the creator does not specify the entities to approve, the bug ticket, by default, requires acknowledgements and approval from a set of default entities (e.g., a product manager 214A, 216A, a code development manager 214B, 216B, and a quality assurance manager 214C, 216C).

In one implementation, the information stored in the bug tickets 208A, 210A may further include description of a bug and the fix to the bug. This description may help product manages 214A, 216A, code development managers 214B, 216B, and quality assurance managers 214C, 216C to understand the issues and make informed decisions.

In one implementation, the staging area 202 and the authoritative repository 204 are part of a GIT version-controlled code repository in which patches 208, 210 are submitted to the staging area 202 via a commit command. When the patch owner commits the patch to the staging area 202, the patch owner is prompted via the user interface to enter information about the patch in a commit message. For example, as shown in FIG. 2, patches 208, 210 committed to the staging area 202 may be associated with commit messages 208A, 210A, respectively.

In one implementation, a patch 210 may be merged into the staging area 202 before the bug ticket 210C associated with the patch 210 has received all of the necessary acknowledgements and may not be submitted to the authoritative repository 204. In one implementation, the developer of patch 210 may record a bug identifier in the commit message 210A for the patch 210. The bug identifier in the commit message 210A may include a hyperlink to link the bug identifier to the bug ticket 210C stored in the bugzilla 206.

As previously discussed, the bug tickets 208C, 210C may include acknowledgment flags whose values indicate whether a bug ticket has received specific acknowledgement and a version flag whose value indicates whether the bug ticket receives all of the necessary acknowledgements. A patch may be submitted to the authoritative repository if the bug ticket associated with the patch receives all of the acknowledgements indicating an approval.

As discussed before, entities that are responsible for acknowledgements often fail to provide timely acknowledgements. To address this issue, in one implementation, the bug ticket acknowledgement system 200 may include a bug ticket monitor application 108 as shown in FIG. 1 to monitor patches that had been submitted to the staging area 202 during a pre-determined period of time (e.g., with the last twenty four hours or since last release of the software product). The bug ticket monitor application 108 may identify these patches committed during the pre-determined period of time by checking the commit time of the respective patches. In response to identifying the set of patches that have been committed to the staging area during the pre-determined period, the bug ticket monitor application 108 may identify the bugs contained in the commit messages 208A, 210A associated with the set of patches 208, 210. For each of the patches, the bug ticket monitor application 108 may determine whether the patch is associated with a bug ticket that does not include any of the requisite acknowledgements. In one implementation, the bug ticket monitor application 108 may trace the hyperlink in the commit message to the associated bug ticket and make the determination based on the value of the version flag in the bug ticket. For example, if the version flag is set, the bug ticket monitor application 108 may determine that the associated bug ticket has received the mandatory acknowledgements. If the version flag is not set yet, the bug ticket monitor application 108 may determine that there is at least one missing acknowledgement and further check each of the acknowledgement flags of the associated bug ticket to determine which entity failed to provide an acknowledgement.

In response to determining the entities that failed to provide an acknowledgement, the bug ticket monitor application 108 may generate and transmit a notification to the entity to inform the entity about the missing acknowledgement. In one implementation, the notification may be an e-mail that includes a hyperlink to a user interface web page via which the entity may provide an acknowledgement. In another implementation, the notification may be a text message including a response pathway (e.g., a phone number) through which the entity may provide the mandatory acknowledgement. In yet another implementation, the notification may include both an e-mail and a text message to the entity to provide a multi-mode notification to the entity.

In one implementation, the bug ticket monitor application 108 may periodically query the bugzilla 206 to determine whether any bug tickets miss acknowledgements. As discussed before, each bug ticket in the bugzilla 206 may include version flags and acknowledgement flags to indicate the status of acknowledgements. For example, the bug ticket monitor application 108 may check the version flag in a bug ticket 208C, 210C to determine whether the bug ticket miss any acknowledgements. If the value of the version flag indicates that the bug ticket has received all three acknowledgements, the bug ticket monitor application 108 may check next data entry. If, however, the value of the version flag indicates that the bug ticket misses at least one acknowledgement, the bug ticket monitor application 108 may further check individual acknowledgement flags of the bug ticket to determine which entity fails to acknowledge. The bug ticket monitor application 108 may then generate and transmit a notification to the entity to inform about the missing acknowledgement.

Figure 3:
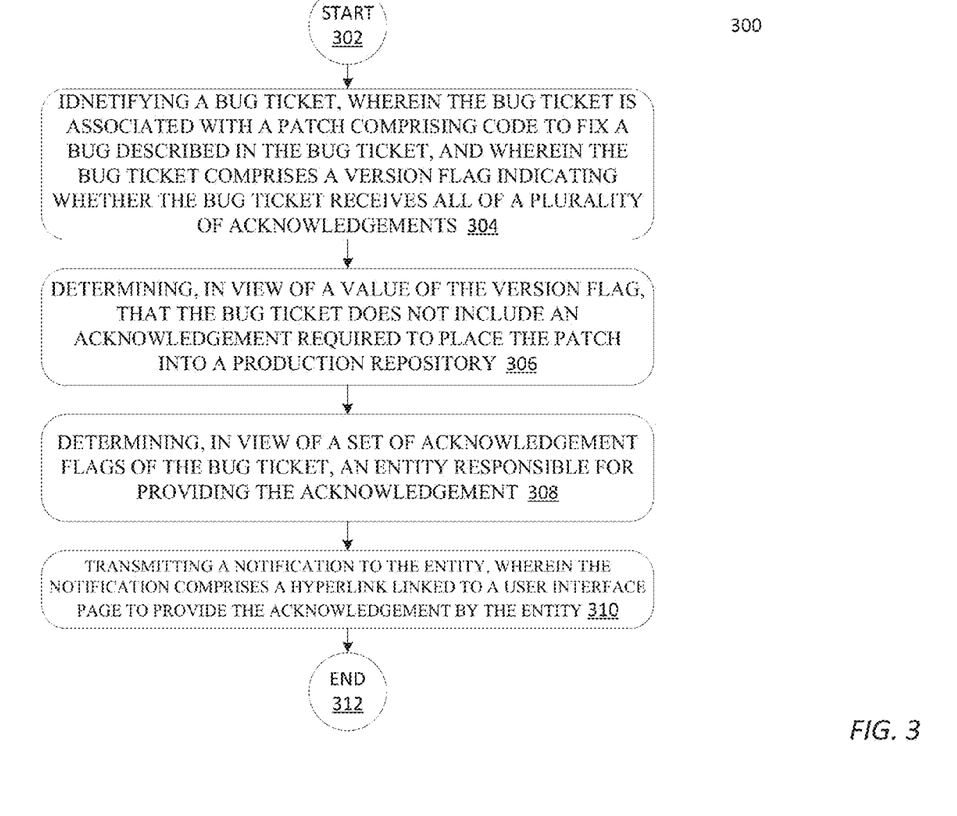
FIG. 3 is a flow diagram illustrating a method to identify unacknowledged bug tickets and notify the responsible entities according to some implementations of the disclosure.

FIG. 3 is a flow diagram illustrating a method 300 to identify unacknowledged bug tickets and notify the responsible entities according to some implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. In one implementation, the methods may be performed by the processing device 102 executing the bug ticket monitor application 108 as shown in FIG. 1.

Referring to FIG. 3, at 302, the processing logic may start. At 304, the processing logic retrieves and identifies a bug ticket stored in a data record (e.g., a bugzilla). As discussed above, the bug ticket may have been created in response to discovering a bug in a software product. The bug ticket may be associated with a patch to fix the bug. In one implementation, the bug ticket may include a version flag and a number of acknowledgement flags. The each acknowledgement flag may include a value indicating whether the bug ticket has received the acknowledgement (approval or disapproval) from a responsible entity, and the version flag may include a value indicating whether the bug ticket receives all of the necessary acknowledgement flags.

At 306, the processing logic may determine from a value of the version flag of the bug ticket that the bug ticket does not include a mandatory acknowledgement from at a responsible entity. For example, the value of the version flag of this bug ticket may be zero "0" indicating that the version flag is not set (i.e., at least one entity failed to provide a mandatory acknowledgement).

At 308, the processing logic determines which entity failed to provide the mandatory acknowledgement. The processing logic may check a set of acknowledgement flags that each corresponds to one type of acknowledgement responsible by one respective entity. The type of acknowledgement may include, for example, a product manager acknowledgement, a development manager acknowledgement, or a quality assurance manager acknowledgement. The value of an acknowledgement flag can indicate "acknowledged with approval," "acknowledged with disapproval," and "not acknowledged." The processing logic may determine the entities that have not acknowledged the bug ticket in the data record.

At 310, the processing logic transmits a notification to the entity that failed to provide the mandatory acknowledgement to request that the entity to provide the acknowledgement. In one implementation, the notification is a customized message directed to the particular entity with respect to the particular acknowledgement that the entity is responsible for. Further, the notification may include a hyperlink to a web page that provides an interface configured to provide the requisite acknowledgement to the bug ticket, thus facilitating the acknowledgement process.

In one implementation, the processing logic may cycle through all bug ticket in the data record to identify those that have missing acknowledgements, and generate and transmit customized notifications to entities responsible for the missing acknowledgements.

Although the notification of missing acknowledgements is described in the context of but tickets to software code, implementations of present disclosure may be applied to other types of documents in code development that require acknowledgements. For example, the documents may include an Errata document (a list of all bugs that have been fixed in a software release) and the processing logic may remind the owner of the software product to update the Errata document after the code has been updated.

Figure 4:
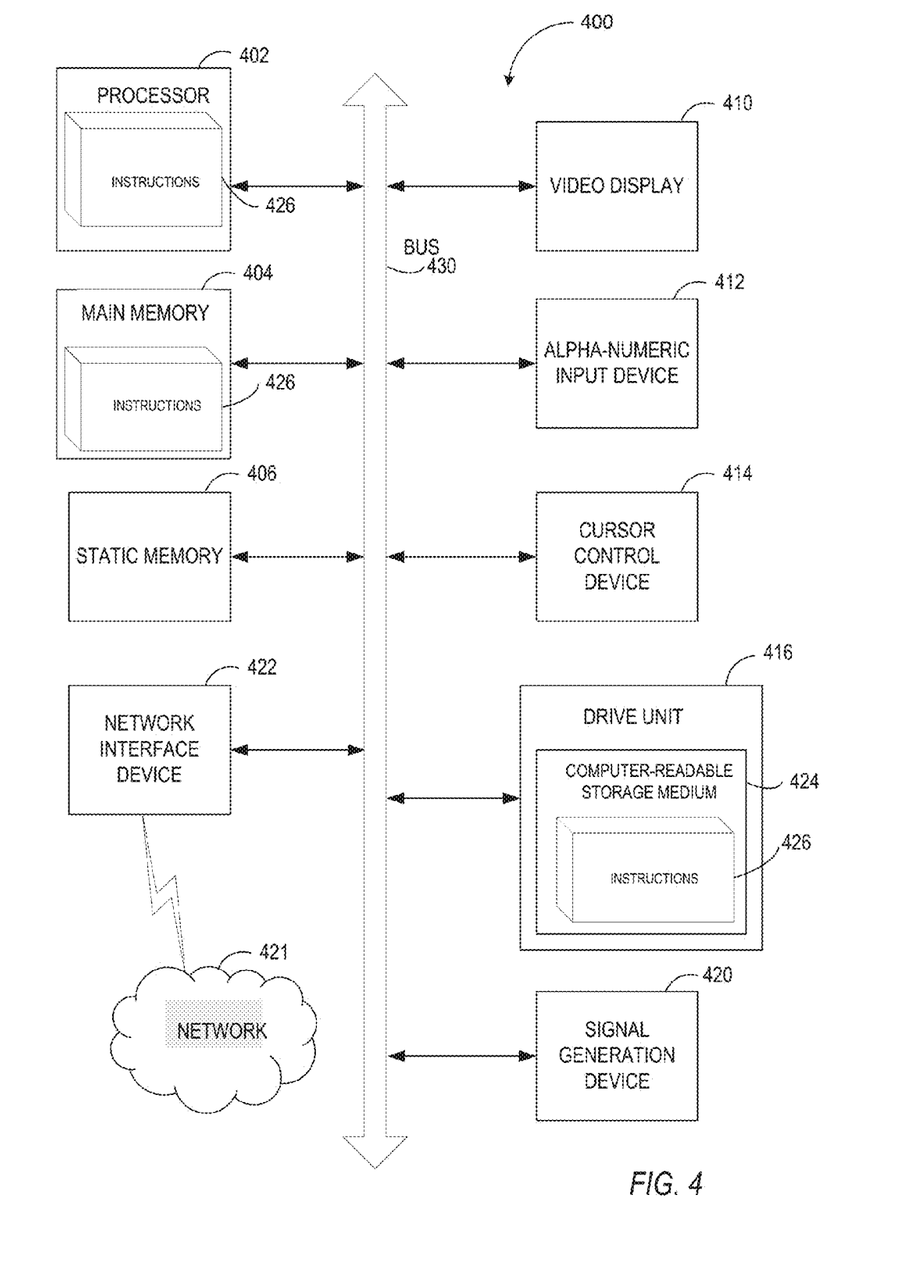
FIG. 4 is a block diagram illustrating an exemplary computer system according to an implementation of the disclosure.

FIG. 4 illustrates a diagrammatic representation of a machine in the exemplary form of a computer system 400 within which a set of instructions for causing the machine to perform any one or more of the methodologies discussed herein may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD), a cathode ray tube (CRT), or a touch screen), an alphanumeric input device 412 (e.g., a keyboard), a cursor control device 414 (e.g., a mouse), and a signal generation device 420 (e.g., a speaker).

The data storage device 418 may include a computer-readable storage medium 424 on which is stored one or more sets of instructions 426 (e.g., software) embodying any one or more of the methodologies or functions described herein (e.g., the bug ticket monitor application 108). The instructions 426 may also reside, completely or at least partially, within the main memory 404 and/or within the processor 402 during execution thereof by the computer system 400, the main memory 404 and the processor 402 also constituting computer-readable storage media. The instructions 426 may further be transmitted or received over a network 474 via the network interface device 422.

While the computer-readable storage medium 424 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   identifying, by a processing device, a bug ticket stored in a data record, wherein the bug ticket is associated with a patch comprising code to fix a bug described in the bug ticket, and wherein the bug ticket comprises a version flag indicating whether the bug ticket receives all of a plurality of acknowledgements;
   determining, in view of a value of the version flag, that the bug ticket does not include an acknowledgement required to place the patch into a production repository;
   determining, in view of a set of acknowledgement flags of the bug ticket, an entity responsible for providing the acknowledgement; and
   transmitting a notification to the entity, wherein the notification comprises a hyperlink linked to a user interface page to provide the acknowledgement by the entity.

2. The method of claim 1, further comprising:
   in response to receiving all of the plurality of acknowledgements, submitting the patch the production repository to modify a software code stored in the production repository.

3. The method of claim 1, wherein the production repository is part of a GIT version-controlled code repository.

4. The method of claim 1, wherein the plurality of acknowledgements comprise at least one of a first acknowledgement by a product manager, a second acknowledgement by a development manager, or a third acknowledgement by a quality assurance manager.

5. The method of claim 4, wherein the set of acknowledgement flags comprise:
   a first acknowledgement flag that comprises a value indicating whether the product manager acknowledges and approves the bug ticket, acknowledges and disapproves the bug ticket, or has not acknowledged the bug ticket,
   a second acknowledgement flag that comprises a value indicating whether the development manager acknowledges and approves the bug ticket, acknowledges and disapproves the bug ticket, or has not acknowledged the bug ticket, and
   a third acknowledgement flag that comprises a value indicating whether the quality assurance manager acknowledges and approves the bug ticket, acknowledges and disapproves the bug ticket, or has not acknowledged the bug ticket.

6. The method of claim 5, wherein the value of the version flag is calculated in view of the value of the first acknowledgement flag, the value of the second acknowledgement flag, and the value of the third acknowledgement flag.

7. The method of claim 1, wherein identifying the bug ticket further comprises:
   identifying the patch committed to a staging area during a pre-determined period; and
   identifying a hyperlink, embedded in a commit message associated with the patch, that is linked to the bug ticket.

8. The method of claim 1, wherein the notification comprises at least one of an e-mail message or a text message to the entity, and wherein the user interface page provides a user interface element through which the entity provides the acknowledgement.

9. The method of claim 1, further comprising:
   transmitting the notification to request the acknowledgement at a specified time interval until the entity provides the acknowledgement.

10. A non-transitory machine-readable storage medium storing instructions which, when executed, cause a processing device to:
    identify, by the processing device, a bug ticket stored in a data record, wherein the bug ticket is associated with a patch comprising code to fix a bug described in the bug ticket, and wherein the bug ticket comprises a version flag indicating whether the bug ticket receives all of a plurality of acknowledgements;
    determine, in view of a value of the version flag, that the bug ticket does not include an acknowledgement required to place the patch into a production repository;
    determine, in view of a set of acknowledgement flags of the bug ticket, an entity responsible for providing the acknowledgement; and
    transmit a notification to the entity, wherein the notification comprises a hyperlink linked to a user interface page to provide the acknowledgement by the entity.

11. The non-transitory machine-readable storage medium of claim 10, wherein the production repository is part of a GIT version-controlled code repository.

12. The non-transitory machine-readable storage medium of claim 10, wherein the plurality of acknowledgements comprise at least one of a first acknowledgement by a product manager, a second acknowledgement by a development manager, or a third acknowledgement by a quality assurance manager.

13. The non-transitory machine-readable storage medium of claim 12, wherein the set of acknowledgement flags comprise:
 a first acknowledgement flag that comprises a value indicating whether the product manager acknowledges and approves the bug ticket, acknowledges and disapproves the bug ticket, or has not acknowledged the bug ticket,
 a second acknowledgement flag that comprises a value indicating whether the development manager acknowledges and approves the bug ticket, acknowledges and disapproves the bug ticket, or has not acknowledged the bug ticket, and
 a third acknowledgement flag that comprises a value indicating whether the quality assurance manager acknowledges and approves the bug ticket, acknowledges and disapproves the bug ticket, or has not acknowledged the bug ticket.

14. The non-transitory machine-readable storage medium of claim 13, wherein the value of the version flag is calculated in view of the value of the first acknowledgement flag, the value of the second acknowledgement flag, and the value of the third acknowledgement flag.

15. The non-transitory machine-readable storage medium of claim 14 wherein the processing device is further to:
 in response to determining that the value of the version flag indicates that the patch is acknowledged and approved by the product manager, the development manager, and the quality assurance manager, submit the patch to the production repository.

16. The non-transitory machine-readable storage medium of claim 13, wherein the notification comprises at least one of an e-mail message or a text message to the at least one entity, and wherein the user interface page provides a user interface element through which the entity provides the acknowledgement.

17. A system, comprising:
 a memory; and
 a processing device, operatively coupled to the memory, the processing device to:
  identify a bug ticket stored in a data record, wherein the bug ticket is associated with a patch comprising code to fix a bug described in the bug ticket, and wherein the bug ticket comprises a version flag indicating whether the bug ticket receives all of a plurality of acknowledgements,
  determine, in view of a value of the version flag, that the bug ticket does not include an acknowledgement required to place the patch into a production repository,
  determine, in view of a set of acknowledgement flags of the bug ticket, an entity responsible for providing the acknowledgement, and
  transmit a notification to the entity, wherein the notification comprises a hyperlink linked to a user interface page to provide the acknowledgement by the entity.

18. The system of claim 17, wherein the processing device is further to in response to receiving all of the plurality of acknowledgements, submit the patch to the production repository to modify a software code stored in the production repository, and wherein the production repository is part of a GIT version-controlled code repository.

19. The system of claim 17, wherein the plurality of acknowledgements comprise at least one of a first acknowledgement by a product manager, a second acknowledgement by a development manager, or a third acknowledgement by a quality assurance manager.

20. The system of claim 17, wherein the notification comprises at least one of an e-mail message or a text message to the at least one entity, and wherein the user interface page provides a user interface element through which the entity provides the acknowledgement.

* * * * *